April 22, 1941.   C. D. STEWART   2,238,954
BRAKE MECHANISM
Filed Nov. 18, 1938
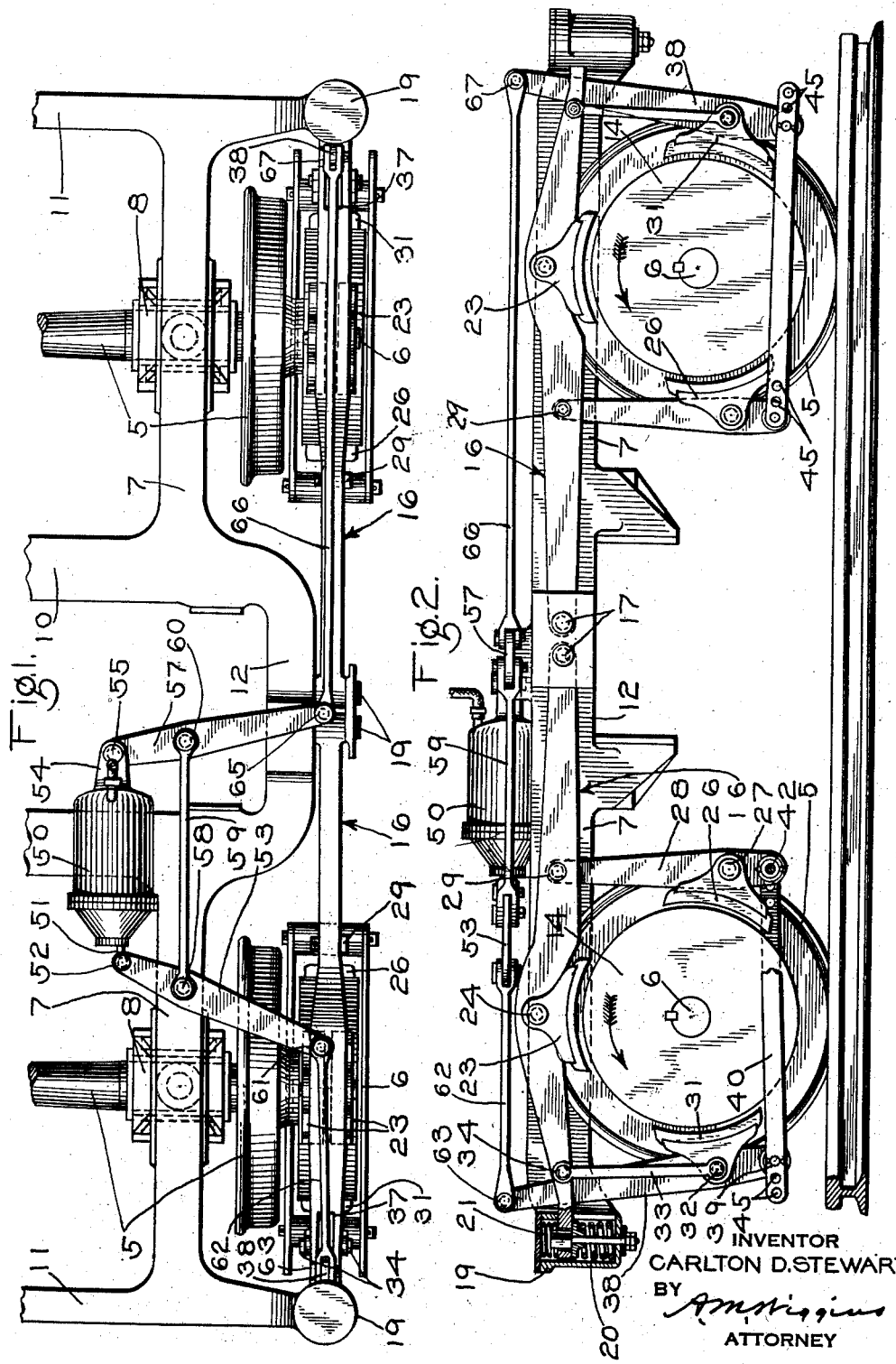
INVENTOR
CARLTON D. STEWART
BY
ATTORNEY Patented Apr. 22, 1941

2,238,954

UNITED STATES PATENT OFFICE 2,238,954

BRAKE MECHANISM

Carlton D. Stewart, Wilkinsburg, Pa., assignor to The Westinghouse Air Brake Company, Wilmerding, Pa., a corporation of Pennsylvania Application November 18, 1938, Serial No. 241,127

3 Claims. (Cl. 188—58)

This invention relates to brakes for railway vehicles, and more particularly to the type embodying clasp brake mechanisms cooperative with brake drums carried by the wheel and axle assemblies of a railway truck.

In my copending application for a patent on a brake mechanism filed in the United States Patent Office June 18, 1938, Serial No. 214,517, Patent No. 2,177,953, issued Oct. 31, 1939, there is disclosed an improved clasp brake equipment adapted to be mounted adjacent each wheel of a truck and comprising a brake drum, a longitudinally disposed carrier member resiliently supported by the truck frame and carrying a brake shoe in alignment with the top of the drum, a pair of similar shoes suspended from the carrier at each side of the drum, and an individual brake cylinder operative to effect application of all three shoes to the drum in such a manner that the drag and displacement of the brake shoes are utilized to increase the braking force, while transmission of such force to the truck frame and consequent overloading of the truck springs are substantially prevented.

On trucks adapted for certain classes of railway service it is desirable to provide truck brake mechanisms embodying the features above referred to in association with brake cylinders which may be mounted on the truck inboard of the wheels, and each of which brake cylinders is associated with lever means adapted to effect operation of two or more of the clasp brake mechanisms simultaneously.

The principal object of my invention is to provide a truck with clasp brake equipments of the above type and individually including a brake drum mounted outwardly of each wheel, brake shoes suspended at opposite sides of the drum below the horizontal center line thereof, a top shoe, and levers cooperative therewith to draw or constrict all three shoes against the drum, together with brake cylinders mounted on transoms or other inboard portions of the truck frame, and lever means operatively connecting each of said brake cylinders with the two or more clasp brake mechanisms associated with the wheels on one side of the truck.

Other objects and advantages of the invention will appear in the following more detailed description thereof, taken in connection with the accompanying drawing, wherein Fig. 1 is a fragmentary plan view of a railway truck having associated therewith a clasp brake equipment constructed according to the invention; and Fig. 2 is a side elevational view of the truck and brake equipment shown in Fig. 1.

The simplified form of railway truck illustrated in the drawing is similar in construction to that shown and described in the aforementioned patent application Serial No. 214,517, and comprises two wheel and axle assemblies 5, the axles of which have extensions 6 projecting outwardly of the wheels, and a truck frame having inset side frame portions 7 disposed adjacent each wheel and carried on journals 8 supported by the axle. Only one side of the truck is shown in Fig. 1 of the drawing, but it will be understood that the side frame portions 7 thereof are joined with similar side portions not shown by means of a pair of transversely disposed transoms 10 and similarly disposed end members 11. The transoms 10 are formed intermediate the wheel and axle assemblies 5 and terminate at each side of the truck in a side frame portion 12 extending outwardly and beyond the wheels.

According to the invention, a clasp brake rigging is provided adjacent each wheel of the truck, and is operable to apply braking force to the peripheral surface of a brake drum 14, which is keyed or otherwise secured to the extension 6 outwardly of the wheel. As is best shown in Fig. 2 of the drawing, a longitudinally disposed channel carrier member 16 is provided above each brake drum 14, one end of which carrier member is pivotally connected to one of a pair of transversely disposed studs 17 extending outwardly from the side frame portion 12. The outer or free end of each carrier member 16 is fitted into a hollow spring guide portion 19, one of which is formed at each corner of the truck frame, and each of which has mounted therein a coil spring 20 adapted to support the end of the carrier member and an upper spring 21 for resisting upward movement of that member with respect to the frame.

Referring to one clasp brake mechanism for convenience in the description of features common to all, it will be noted that the portion of the carrier member 16 directly above the brake drum 14 and outwardly of the center of the member is somewhat cambered to accommodate a pair of brake shoes 23, which are pivotally connected to the carrier member by means of a pin 24. In addition to the brake shoes 23 adapted for braking engagement with the surface of the brake drums 14, the carrier member 16 is adapted to support a pair of brake shoes 26, the heads of which are connected by means of a pin 27 to a hanger lever 28 that is in turn pivotally connected by a pin 29 to the carrier member, and a pair of brake shoes 31 having the heads thereof connected by a pin 32 to parallel hangers 33 which are pivotally supported by means of studs 34 secured to the carrier member 16.

The pairs of brake shoes 26 and 31 are disposed in clasp arrangement on either side of the brake drum 14 and somewhat below the horizontal center line thereof. It will thus be observed that, with reference to the circular drum 14, brake shoes 26 and 31 are disposed equidistant from the top brake shoes 23 and are adapted to engage the brake drum with their median points spaced substantially more than 90° on either side of the median points of engagement of the shoes 23 with the brake drum.

Pivotally connected to the transversely disposed pin 32 between the parallel hangers 33 is a substantially vertical brake lever 38, the upper end of which extends through a slot 37 formed in the carrier member 16, and the lower and shorter end of which carries a transversely disposed pin 39. A pair of longitudinally arranged link members 40 are provided for operatively connecting the pin 39 to a similarly arranged pin 42 which is secured to the hanger lever 28 below the pivotal connection thereof with the brake shoes 26. It will be noted that each link member 40 is provided at either end with a plurality of holes 45 adapted to receive the corresponding pin 39 or 42 so that the desired slack adjustment may be effected to maintain the brake shoes 26 and 31 so positioned with respect to the drum 14 that when the upper end of the lever 38 is initially pulled toward the center of the truck, the shoes 31 will engage the drum and provide a fulcrum about which the lever can be turned to pull the link members 40 and hanger lever 28 outwardly for quickly bringing the shoes 26 into braking relation with the drum.

According to my invention, the brake mechanisms associated with the wheels on each side of the truck are adapted to be actuated together by means of a common brake cylinder 50, which is secured by suitable means, not shown, to one of the transoms 10 of the truck frame inboard of and substantially above the wheel and axle assemblies 5. The brake cylinder 50 is of the usual type and has a movable piston rod 51 pivotally connected to a pin 52 carried on the inner end of a horizontally disposed brake cylinder lever 53. A stationary lug 54 is formed on the end of the brake cylinder opposite that through which the piston rod extends, and carries a pin 55 having pivotally connected thereto the inner end of a horizontally disposed brake cylinder lever 57, which together with lever 53 extends transversely of the truck frame into operative alignment with the brake levers 38 of the drum brake mechanisms at the adjacent side of the truck. A tie rod 59 is pivotally connected to the associated levers 53 and 57 intermediate their ends, by means of pins 58 and 60, respectively.

The outer end of the lever 53 is pivotally connected by means of a pin 61 to a longitudinally disposed pull rod 62 that is in turn connected by a pivot pin 63 to the upper end of the brake lever 38 at the adjacent end of the truck. Similarly, the end of the brake cylinder lever 57 is operatively connected by a pin 65 to a pull rod 66, which extends to the other end of the truck and is there pivotally connected by a pin 67 to the brake lever 38 of the second brake mechanism.

With the brakes released as shown in the drawing, the brake cylinder levers 53 and 57 are initially disposed in somewhat canted positions with respect to the transverse portions of the truck, so that upon movement thereof into brake applying position the levers will assume substantially right angular positions with respect to the longitudinally arranged pull rods 62 and 66 in order to transmit the maximum force exerted through the medium of the piston rod 51 to the two drum brake mechanisms.

*Operation*

When the usual air brake control equipment, not shown, is operated to effect the supply of fluid under pressure to the brake cylinder 50, the piston therein is actuated to move the piston rod 51 and pin 52 outwardly and thereby to operate the brake cylinder lever 53, which is adapted to rotate in a counterclockwise direction about the pin 58 while at the same time acting through the medium of the tie rod 56 and pin 60 to turn the brake cylinder lever 57 in a clockwise direction about the pin 55. This operation of the lever 53 effects movement of the pull rod 62 and pin 63 to the right, as viewed in the drawing, while the simultaneous operation of the lever 57 causes leftward movement of the pull rod 66 and pin 38.

It will thus be seen that the vertically disposed brake lever 38 of each of the drum brake mechanisms is actuated through the medium of the associated pull rods as above explained to move the respective brake shoes 31 and 26 into braking engagement with the peripheral braking surface of the corresponding brake drum 14. Considering each mechanism individually, with the brake shoes 26 and 31 thus in engagement with the drum 14 below the horizontal center line thereof, the increasing force applied to the brake shoes by the operation of the brake cylinder levers causes the shoes to move toward each other and downwardly along the peripheral surface of the brake drum, the downwardly directed force due to such action being transmitted through the hanger members 28 and 33, respectively, to the carrier member 16. The carrier member 16 is thereby pulled downwardly, rotating about the pivotal connection with the stud 17 and against the opposing force of the spring 20, so as to move the top brake shoes 23 into engagement with the drum 14. At this time the downward movement of the carrier member and the associated elements of the brake mechanism carried thereby will stop, since the member will now be rigidly supported by both the truck frame and the brake drum.

Assuming that the wheel and axle assemblies 5 and brake drum 14 are rotating in the direction indicated by the arrows in Fig. 2 of the drawing, so that the truck is traveling toward the left, the drag of the drum 14 on the brake shoes 31 at the forward or left-hand end of the truck causes a further downwardly directed pull to be applied through the medium of the hanger 33 to the outer end of the associated carrier member 16, thus tending to augment the force acting on the brake shoe 23. On the other hand, the drag of the brake shoes 26 at this end of the truck has a tendency to move said shoes upwardly, but this upward force is overbalanced by the downward force tending to move both pairs of shoes downwardly along the brake drum as already explained. There is, therefore, no resultant upward force actually applied to the shoes 26 and tending to lift the top shoes 23, but it will be apparent that the downward pull of the brake shoes 31 on the carrier member 16 will exceed the downward pull of the brake shoes 26 on that member. Because of this difference in the magnitude of the downwardly directed forces acting on the shoes 26 and 31, the carrier member 16 will tend to rock in a counterclockwise direction and will thus transmit an upwardly directed force to the stud 17 connecting the member to the truck frame.

On the rear or trailing portion of the truck, the greater downward pull will of course be on the shoes 26, so that the corresponding carrier member 16 will be caused to transmit a downwardly directed force to the stud 17 connecting that member to the truck frame.

It will thus be seen that when the brake rigging elements are in application position as just explained, the force exerted by operation of the brake cylinder device 15 is transmitted through the medium of the transversely disposed brake cylinder levers 53 and 57 to each of the drum brake mechanisms on the corresponding side of the truck in substantially equal degree and with maximum efficiency. It will further be apparent that, in the case of the drum brake rigging for each wheel, the upper brake shoes 23 not only serve in application position to assist in supporting the carrier member 16 and thereby the other braking elements, but also act to resist rotary movement of the drum by materially increasing the braking action on the wheel and axle assembly for any given brake applying force produced.

The release of the brakes may be accomplished in the usual manner by effecting operation of the air brake equipment to vent fluid under pressure from the brake cylinder 50, thereby permitting the several brake levers and other rigging members to assume their normal release position, as shown in the drawing. It will here be noted that as the brake shoes 26 and 31 move out of contact with the brake drum 14 of each of the drum brake mechanisms the corresponding spring 20 acts to raise the other end of the associated carrier member 16, thereby moving the brake shoes 23 out of engagement with the drum. Each of the springs 20 thus again becomes effective to provide resilient support for the three brake shoes and rigging members of the associated drum brake mechanism.

Having now described my invention, what I claim as new and desire to secure by Letters Patent, is:

1. In a brake equipment for a railway truck including two wheel and axle assemblies and a frame having journaled support thereon, in combination; movable carrier members longitudinally disposed in pairs on each side of the truck and resiliently supported thereby; brake drums carried by said wheel and axle assemblies outwardly of the wheels and beneath said carrier members, respectively; brake means associated with each of said drums individually comprising a top shoe mounted on the adjacent carrier member above the drum, a pair of clasp shoes hung from said member below the horizontal center line of the drum, and means including a substantially vertical brake shoe lever movable toward the center of the truck to control the initial application of said pair of shoes to the drum and the resultant application of said top shoe thereto; and separate operating means each common to the pair of drum brake mechanisms on one side of the truck and comprising a brake cylinder device mounted on the frame inboard of the wheels, a transversely disposed live brake cylinder lever having an inner end connected to the piston rod of said brake cylinder device, a similarly disposed dead brake cylinder lever having its inner end fulcrumed on said brake cylinder device, a tie rod connecting said levers intermediate their ends, and pull rods operatively connecting the outer ends of said live and dead levers to the upper ends of the said vertical brake shoe levers, respectively.

2. In a brake equipment for a railway truck including wheel and axle assemblies and a frame supported thereby, in combination, brake drum secured to said assemblies outwardly of the wheels, clasp brake mechanisms disposed outboard of said wheels and cooperative with said drums, respectively, a brake cylinder device mounted on said frame inboard of the wheels along one side thereof, a transversely disposed floating brake cylinder lever having its inner end operatively connected to the piston rod of said brake cylinder device and its outer end extending into operative alignment with the adjacent outboard brake mechanisms, a similarly disposed dead lever having its inner end fulcrumed on said brake cylinder device, a tie rod connecting said levers intermediate their ends, and pull rods connecting said outer ends of said levers with said clasp brake mechanisms, respectively.

3. In an outboard clasp brake mechanism for a railway truck of the class involving a wheel and axle assembly and a frame carried thereon; a brake drum mounted on said assembly outwardly of the wheel, a horizontally disposed movable member having one end pivotally connected to said frame and the other end spring supported thereby, said member being carried above and in alignment with said drum, a brake shoe carried by said member in operative alignment with the top of said drum, a pair of connected brake shoes hung from said member at opposite sides of said drum and below the horizontal center line thereof, a substantially vertical brake lever operatively connected to said shoes and having its upper end projecting through a slot formed in said horizontal movable member, a brake cylinder device mounted on said frame inboard of the wheel, and rigging mechanism operatively connecting said brake cylinder device with said upper end of the brake lever.

CARLTON D. STEWART.